United States Patent
Ogawa

(10) Patent No.: US 7,234,162 B2
(45) Date of Patent: Jun. 19, 2007

(54) COMMUNICATION APPARATUS AND COMMUNICATION METHOD

(75) Inventor: Hidehiko Ogawa, Kanagawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 757 days.

(21) Appl. No.: 09/734,158

(22) Filed: Dec. 11, 2000

(65) Prior Publication Data

US 2001/0032243 A1    Oct. 18, 2001

(30) Foreign Application Priority Data

Apr. 17, 2000    (JP)    ............... 2000-114793

(51) Int. Cl.
    *G06F 21/00*    (2006.01)
(52) U.S. Cl. ........................ 726/17; 358/400
(58) Field of Classification Search ............... 713/202, 713/182, 183; 709/245; 726/17; 358/400
See application file for complete search history.

(56) References Cited

U.S. PATENT DOCUMENTS

| | | | | |
|---|---|---|---|---|
| 5,732,137 A | * | 3/1998 | Aziz | 713/155 |
| 5,805,298 A | * | 9/1998 | Ho et al. | 358/402 |
| 5,881,233 A | * | 3/1999 | Toyoda et al. | 709/233 |
| 5,987,517 A | * | 11/1999 | Firth et al. | 709/230 |
| 6,016,478 A | * | 1/2000 | Zhang et al. | 705/9 |
| 6,574,670 B1 | * | 6/2003 | Eguchi | 709/245 |
| 6,615,241 B1 | * | 9/2003 | Miller et al. | 709/206 |

* cited by examiner

*Primary Examiner*—Kambiz Zand
*Assistant Examiner*—Andrew L. Nalven
(74) *Attorney, Agent, or Firm*—RatnerPrestia

(57) ABSTRACT

A communication apparatus and a communication method capable of selecting desired sender-information in a short time from multiple of registered sender-information are presented. Sender-default information of the communication apparatus is stored in a default information table of the memory section, and sender-information including password is stored in sender-information table. The apparatus collates the sender-information stored in the sender-information table by an input password, selects sender-information matched in password, and attaches the sender-information to a transmitted data.

8 Claims, 3 Drawing Sheets

FIG. 2

Caller Information Table 31    32    33

| Name | Mail Address | Password |
|---|---|---|
| H. Ogawa | hogawa@panasonic.co.jp | 042253 |
| T. Wakabayashi | twakaba@panasonic.co.jp | 091159 |
| K. Toyoda | ktoyo@panasonic.co.jp | 114255 |
| | | |
| | | |
| | | |
| | | |
| | | |
| | | |
| | | |

FIG. 3

Default Information Table    41    42

| Name | Mail Address |
|---|---|
| MGCS IFAX | ifax01@panasonic.co.jp |

COMMUNICATION APPARATUS AND COMMUNICATION METHOD

FIELD OF THE INVENTION

The present invention relates to a communication apparatus such as network facsimile machine and a method of communicating image data using the same.

BACKGROUND OF THE INVENTION

When transmitting data by a facsimile, transmission data generally includes sender-information. Generally, sender-information is preliminarily registered in a transmitting facsimile machine, and the sender-information is written over a received image or recorded at the upper end of the received image at a recipient side.

The method of registering the sender-information in the facsimile machine is generally to enter the information from the panel of the facsimile machine. In another method, for example, the data prepared by a personal computer (PC) is sent into the facsimile machine through a public network. The communication apparatus such as the network facsimile machine employs a method of registering information by E-mail.

In an ordinary facsimile machine, the sender-information is written over the received image or recorded at the upper end. Even if the sender-information is not written in the text in the received image, the recipient can recognize the sender's name by reading the sender-information recorded in the image.

However, in the case of a network facsimile machine communicating through the Internet or other network, the destination of transmission is not always destined for the facsimile machine, but a mail receiving terminal of a personal computer (PC) or a work station. In the case of such a mail receiving terminal, at the reception side, received data is confirmed with, for example, mail outlook software. Since a manuscript is usually sent in a format of a file attached to the mail, the recipient does not know the sender's name until opening and reading the attached file.

When the recipient sends a return mail by a return mail function of the mail outlook software, it is always sent back to the transmitting facsimile, and it is not always sent to the destination intended by the recipient.

Further, for registering multi-digit data such as a mail address in the facsimile machine, a panel of the facsimile machine is not convenient and it takes much time to register it. A registration operation through the public network requires a special program in the PC, and it is not general. Or the registration operation through E-mail is easy for an input operation. But it is required to register the data in a format that can be recognized by the facsimile and to have enough knowledge for registration.

SUMMARY OF THE INVENTION

A communication apparatus comprising memory for storing sender's information including a password and means for comparing the entered password and the sender-information stored in the memory is provided. The apparatus reads out the sender-information matched in the password and transmits an E-mail with it as the sender-information.

In the apparatus, when transmitting image data by E-mail through the Internet, the sender can set the operator's intended sender-information in the sender column for every transmission, so that the recipient can recognize the sender's name without opening the attached file of the reception data. If multiple items of sender-information are registered, desired sender-information can be selected from them in a short time.

BRIEF DESCRIPTION OF THE DRAWINGS

FIG. 2 illustrates an example of a sender's information table used in the communication apparatus according to an embodiment of the invention.

FIG. 3 illustrates an example of a default information table used in the communication apparatus according to an embodiment of the invention.

DESCRIPTION OF THE PREFERRED EMBODIMENT

Figure 1:
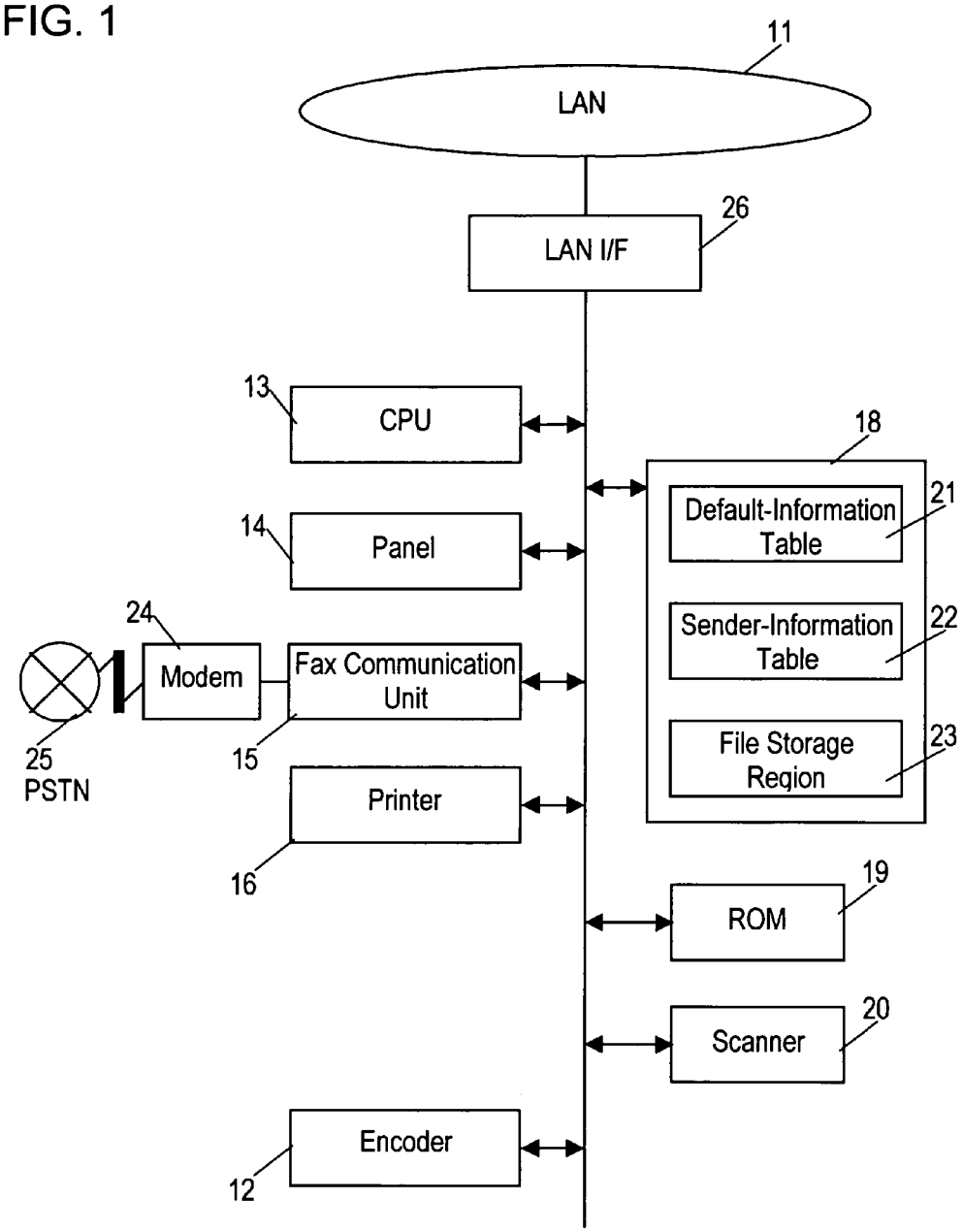
FIG. 1 is a block diagram illustrating an exemplary structure of a communication apparatus according to an embodiment of the invention.

A preferred embodiment of the invention will be described below while referring to the accompanying drawings. FIG. 1 is a block diagram illustrating an exemplary, structure of a communication apparatus according to an embodiment of the invention. Through local area network (LAN) 11, electronic mail data is transmitted and received through the Internet. CPU 13 controls the operation of the apparatus. Panel 14 is used for instructing the reading of an image, and instructing and setting an input of an electronic mail address and various inputs and outputs of the apparatus. FAX communication unit 15 transmits and receives facsimile data. Printer 16 records received data on a recording paper. Encoder 12 encodes the image data read by scanner 20 into binary data, and compresses and expands the data. Memory section 18 stores sender-information, image data to be transmitted, transmission mail data, and the like. Memory section 18 further stores a default information table 21 which stores sender-default-information showing a user name of a communication device and the address, sender-information table 22 which stores sender-information, and file storage region 23 which stores a file continuing transmission and reception data. Read-only memory (ROM) 19 stores the operation program of the apparatus. Scanner 20 captures an image data of a manuscript as an electric signal. Modem 24 transmits and receives facsimile data to and from FAX communication unit 15 through public switched telephone network (PSTN) 25. LAN interface (I/F) 26 couples LAN 11 and a communication apparatus.

The basic operation of transmitting and receiving image data in the communication apparatus of this exemplary embodiment will be explained. First, transmission of image data by an electronic mail will be explained. The manuscript is set on scanner 20 and the start button on panel 14 is pressed. CPU, 13 then operates according to the program stored in ROM 19, and scanner 20 reads the manuscript. The captured image data is encoded into binary data by encoder 12 and stored in file storage region 23 of memory section 18. The image data stored in file storage region 23 is converted into 7-bit text code according to Multi-purpose Internet Mail Extension (MIME) which is the standard format of an electronic mail.

When an operator does not specify sender information, the sender default information stored in default information table 21 is assigned as the sender information, and this sender information is attached to the electronic mail as electronic mail information. On the other hand, when the operator manipulates panel 14 and selects the sender-information to be attached from sender-information table 22, the selected sender-information is attached as the electronic mail information. The detail of sender-default-information and sender-information will be described later.

The mail information thus stored in file storage region 23 is transmitted together with the sender-information as an electronic mail through the Internet to LAN 11 through LAN I/F 26 according to a message transfer protocol of an electronic mail such as Simple Mail Transfer Protocol (SMTP). A recipient can thus see the sender-information on the electronic mail. Even if the image data is transmitted as an attached file, the sender's name can be recognized without opening the attached file.

On the other hand, when sending the image data read by scanner 20 by an ordinary facsimile, the image data is sent from FAX communication unit 15 to a destined facsimile machine at the destination by PSTN 25 through modem 24.

When the image data is received with an electronic mail through the Internet, the image can be seen on the electronic mail. The received image data is stored in file storage region 23, can be seen on the electronic mail, and can be also recorded on recording paper as facsimile data. In this case, the format of the stored image data is inversely converted into binary data of a facsimile format, decoded by encoder 17 into printable data as a visible image, and printed on the recording paper by printer 16. The image data is thus received as a visible image.

When the image data is directly received through PSTN 25 as facsimile data without using the Internet, the image data is printed by printer 16 through FAX communication unit 15 with an ordinary facsimile reception operation.

An exemplary method of preparing sender information will now be explained. FIG. 2 shows sender-information stored in sender-information table 22. A communication apparatus having a facsimile function is installed at an ordinary office and is shared by plural users. Therefore, when the users' individual information is used as sender information, the plural users must register and display his/her own sender information. The sender information table in FIG. 2 illustrates a registered state of plural users. The sender information to be registered consists of an individual user's name 31, e-mail address 32, and password 33. In FIG. 2, password 33 is shown. But actually, only name 31 and e-mail address 32 are visible, and the password 33 is concealed by "****" or another mark.

An exemplary method of user registration will now be explained below. FIG. 3 illustrates sender-default-information stored in default information table 21. The default-information consists of a pairing of a user name 41 with an e-mail address 42 of a communication apparatus. If the user does not set his/her own sender-information, the default-information is automatically attached to a transmitted mail. In the case of an error mail or the like, the error mail is returned to the address specified in the default information.

Figure 4:
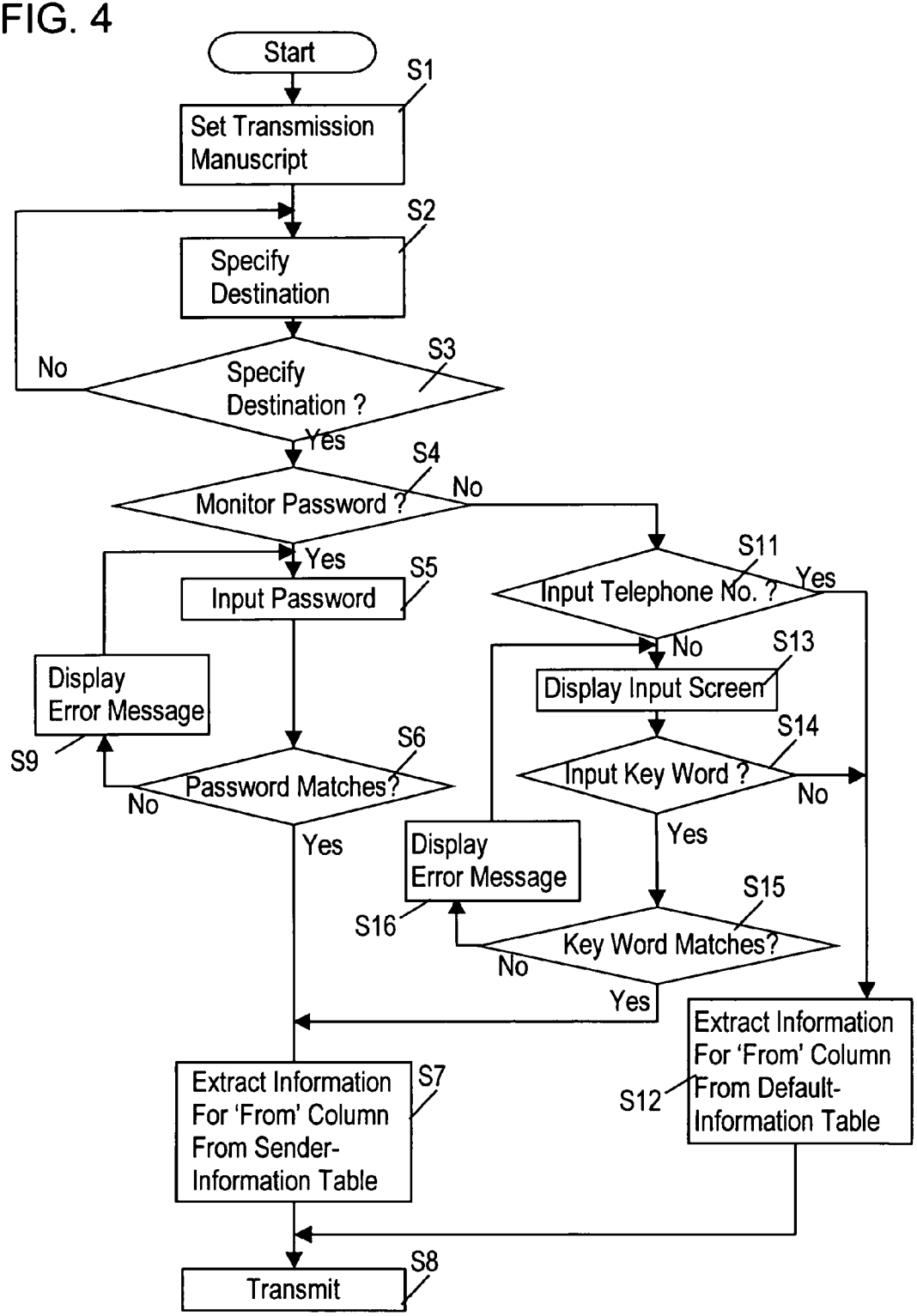
FIG. 4 is a flowchart of an exemplary operation in the communication apparatus according to an embodiment of the invention.

An exemplary operation of the communication apparatus will be explained below according to the flowchart in FIG. 4.

At step S1, the manuscript to be transmitted is set on scanner 20. At next step S2, a destination to be transmitted is specified on manipulating panel 14. At step S3, it is confirmed whether the destination is specified completely or not. If it is specified, the process advances to step S4, and if not specified, returning to step S2, the destination is entered again.

When the destination is specified completely at step S3, advancing to step S4, the screen for selecting whether or not to monitor the password appears. To monitor the password means a process of judging whether the password is registered or not in sender-information table 22. When searching this information by the password and advancing to step S5, a password input screen is presented, and a desired input password is input. In the case of an input password being not registered in the apparatus, or in the case of a password not being searched such as in the case of a password search mode being set to off through the setting of the apparatus, or in the case of a facsimile transmission and not an electronic mail transmission, the password is not monitored, and then the process goes to step S11.

When the input password is input at step S5, it is compared with each password recorded in password column 33 in the sender information table at step S6. An input password that matches a password 33, becomes a first password and the process moves to step S7 wherein the sender-information corresponding to the first password is extracted from the sender-information table, and is written in the "From" column of sender's column in an electronic mail header. In this case, at least one of e-mail address and sender's name may be used as the sender-information. The written sender-information is transmitted together with the transmission manuscript image, which is stored in the file storage region at step S1, by electronic mail or facsimile at step S8. The return e-mail to the received electronic mail is sent to this e-mail address. By inputting only the password, the information identifying the sender such as name, e-mail address, or telephone number can be selected in a short time.

If the password is not matched at step S6, an error message is displayed at step S9. Then, the process returns to step S5, and then, the password is input again.

If the password is not monitored, the exemplary operation is as follows. In the case of the password being not registered at step S4 or in the case of a facsimile transmission not employing a password, the process goes to step S11. At step S11, it is judged whether or not a telephone number is entered at step S2 for specifying the destination, for example, with one of the following methods:

(1) a character string consisting of only numerals is judged to be a telephone number, and a character string containing '@' is judged to be an electronic mail address;
(2) during the setting of a transmission mode in operation, if the Internet button is not pressed, an input character string is judged to be a telephone number;
(3) during the setting of a transmission mode in operation, if the facsimile mode button is pressed, an input character string is judged to be a telephone number;
(4) a character string containing a character other than numerals is judged to be an electronic mail address; and
(5) if the number of numerals of an input character string is less than a specific number of digits used in telephone numbers, it is judged to be an electronic mail address.

The telephone number differs in local districts. When connecting to the PSTN, the initial '0' may be needed as in various cases such as facsimile through an extension line. And therefore, depending on the situation, the character string may be judged in a proper method capable of determining whether the input character string is a telephone number or an electronic mail address.

As a result of the judgment, if the telephone number is input, a facsimile transmission is requested instead of an electronic mail transmission. At this time, going to step S12, the sender-default-information shown in FIG. 3 is extracted from default information table 21. At step S8, this default-information is attached to the transmission manuscript and transmitted by facsimile. As the default-information, name 41 identifying, a facsimile machine or a company is used, and this information is printed in the sender's column set at the top margin of the received manuscript together with the date and other information.

If a telephone number is not input at step S11, the operation is judged to be an electronic mail transmission, and the process goes to is step S13. At step S13, the sender-information-search-screen is displayed. At step S14, when a key word designating the sender-information such as the name or mail address of the registered user is input, the key word is collated at step S15 in sender-information table 22. If a matched one is found, the corresponding sender-information is extracted and written in the "From" column of an electronic mail header, and the electronic mail is transmitted at step S8. If a key word is not input at step S14, going to step S12, sender-default-information is extracted from default information table 21, and the electronic mail is transmitted with the information attached at step S8. The return mail from the recipient is sent to the mail address in this default-information.

If the input key word is not matched at step S15, an error message is displayed at step S16, and returning to step S13, a key word is input again.

In the above explanation, the name, mail address or password is used as the sender-information, but other information identifying the user can be registered as the sender-information such as the job department, title, or employee number, and such information can be used as the key word. In this case, however, such information is not secret to the third party.

Herein, the password is registered, and the sender-information is searched by the password. Alternatively, by setting so as not to input a password in initial setting, it may be also set to always use the sender-default-information.

What is claimed is:

1. A communication apparatus shared by a plurality of users, comprising:
    a memory that stores, for each of the users, user information including a password and a name, and stores a default name;
    a panel for entering a password;
    a destination input unit for entering a character string corresponding to a destination, said destination input unit selecting between email transmission and facsimile transmission based on contents of said character string
    a scanner that scans an image to obtain image data;
    a controller that
        a) for email transmission, extracts from the memory a name corresponding to an entered password, and
        b) for facsimile transmission, extracts the default name from the memory;
    a generator that
        a) for email transmission, generates an email to which an image file of the image data is attached by putting, in the "From" field of the header of the email, the name extracted by the controller, and
        b) for facsimile transmission, generates a facsimile by adding, to the image data, the default name extracted by the controller; and
    a transmitter that
        a) for email transmission, transmits the email generated by the generator to a recipient, and
        b) for facsimile transmission, transmits the facsimile generated by the generator to the recipient.

2. The communication apparatus according to claim 1, wherein the user designates email transmission by entering, on the panel, an email address of the recipient.

3. The communication apparatus according to claim 1, wherein the user designates facsimile transmission by entering, on the panel, a facsimile number of the recipient.

4. A communication apparatus according to claim 1, wherein, said panel is usable for all of the following:
    designating email transmission;
    designating facsimile transmission so that the default name is added to the image data; and
    entering said password.

5. A communication apparatus shared by a plurality of users, comprising:
    a memory that stores, for each of the users, user information including a password and an email address, and stores a default email address;
    a panel for entering a password;
    a destination input unit for entering a character string corresponding to a destination, said destination input unit selecting between email transmission and facsimile transmission based on contents of said character string;
    a scanner that scans an image to obtain image data;
    a controller that
        a) for email transmission, extracts from the memory an email address corresponding to an entered password, and
        b) for facsimile transmission, extracts the default email address from the memory;
    a generator that
        a) for email transmission, generates an email to which an image file of the image data is attached by putting, in the "From" field of the header of the email, the email address extracted by the controller, and
        b) for facsimile transmission, generates a facsimile by adding, to the image data, the default email address extracted by the controller; and
    a transmitter that
        a) for email transmission, transmits the email generated by the generator to a recipient, and
        b) for facsimile transmission, transmits the facsimile generated by the generator to the recipient.

6. The communication apparatus according to claim 5, wherein the user designates email transmission by entering, on the panel, an email address of the recipient.

7. The communication apparatus according to claim 5, wherein the user designates facsimile transmission by entering, on the panel, a facsimile number of the recipient.

8. A communication apparatus according to claim 5, wherein, said panel is usable for all of the following:
    designating email transmission;
    designating facsimile transmission so that the default name is added to the image data; and
    entering said password.

* * * * *